(12) United States Patent
Wesley, Jr.

(10) Patent No.: US 8,430,616 B2
(45) Date of Patent: Apr. 30, 2013

(54) PRESS-SET THREADED SCREWS AND 2 STROKE AIR TOOL FOR INSTALLATION

(75) Inventor: Joseph R. Wesley, Jr., Victor, NY (US)

(73) Assignee: Harris Corporation, Melbourne, FL (US)

( * ) Notice: Subject to any disclaimer, the term of this patent is extended or adjusted under 35 U.S.C. 154(b) by 215 days.

(21) Appl. No.: 12/958,944

(22) Filed: Dec. 2, 2010

(65) Prior Publication Data

US 2012/0137841 A1 Jun. 7, 2012

(51) Int. Cl.
*F16B 39/02* (2006.01)
(52) U.S. Cl.
USPC .............. 411/271; 411/32; 411/33; 411/80.5; 411/325; 411/419
(58) Field of Classification Search ............... 411/18, 411/21, 24, 26, 27, 32–33, 54, 78, 80.5, 271, 411/325, 419, 448
See application file for complete search history.

(56) References Cited

U.S. PATENT DOCUMENTS

| | | | | |
|---|---|---|---|---|
| 1,499,071 A | * | 6/1924 | Pleister | 411/80.5 |
| 2,112,494 A | * | 3/1938 | Olson | 411/187 |
| 4,339,218 A | * | 7/1982 | Navarre | 411/419 |
| 4,976,577 A | * | 12/1990 | Brown et al. | 411/271 |
| 5,183,359 A | * | 2/1993 | Barth | 411/188 |
| 5,221,167 A | * | 6/1993 | Girkin et al. | 411/45 |
| 5,333,977 A | * | 8/1994 | Sugawara | 411/271 |
| 5,356,253 A | * | 10/1994 | Whitesell | 411/188 |
| 5,755,543 A | | 5/1998 | Culpen | |
| 6,116,942 A | | 9/2000 | Chen et al. | |
| 6,280,133 B1 | * | 8/2001 | Haberle | 411/392 |
| 6,908,271 B2 | * | 6/2005 | Breslin et al. | 411/271 |
| 7,165,924 B1 | * | 1/2007 | Breslin et al. | 411/271 |
| 2006/0204348 A1 | * | 9/2006 | Shuart | 411/107 |

FOREIGN PATENT DOCUMENTS

| | | |
|---|---|---|
| AT | 365314 | 1/1982 |
| DE | 29712567 | 11/1997 |
| EP | 0769446 | 4/1997 |

* cited by examiner

*Primary Examiner* — Roberta Delisle
(74) *Attorney, Agent, or Firm* — Harness, Dickey & Pierce, PLC

(57) ABSTRACT

A press-set threaded screw assembly includes a first member having an aperture. A second member abutting the first member includes a threaded bore co-axially aligned with the aperture. A screw body includes a body flange, a neck portion, and a threaded member. The threaded member in a non-installed condition has first and second displacement portions separated by a tapered slot, each having a main thread portion. A pin is frictionally received in a bore created through the body flange and neck portion in a screw non-installed condition. The threaded member is inserted through the aperture and received in the threaded bore in an initial installation condition. The pin is axially aligned to slide into the tapered slot, whereby the pin oppositely displaces the first and second displacement portions away from each other to contact a plurality of female threads of the threaded bore, defining an installed condition.

15 Claims, 6 Drawing Sheets

PRESS-SET THREADED SCREWS AND 2 STROKE AIR TOOL FOR INSTALLATION

FIELD

The present disclosure relates to press-set threaded screws.

BACKGROUND

Fasteners such as threaded screws used for releasably joining two or more items such as plates or panels commonly use additional hardware such as a flat washer to act as a non-rotating support against one of the items and a split or lock washer to resist rotation causing loss of pre-set torque. The additional hardware is both expensive when used in bulk fastening systems and can be lost during transport and before installation of the fastener. This type of fastener also requires axial rotation to set the fastener and provide the required torque to create the necessary holding force.

Fasteners such as rivets reduce the number of parts that can be lost prior to installation however rivets are considered a permanent fastener installation. Removal of a rivet commonly requires the rivet be drilled out, which can cause damage to the item surfaces of the items being joined.

This section provides background information related to the present disclosure which is not necessarily prior art.

SUMMARY

This section provides a general summary of the disclosure, and is not a comprehensive disclosure of its full scope or all of its features.

According to several embodiments, a press-set threaded screw includes a screw body having a body flange; a neck portion axially extending from the body flange; and a threaded member axially extending away from the neck portion. The threaded member in a non-installed condition has first and second displacement portions separated by a tapered slot each having a main thread portion. A pin is frictionally received in a bore created through both the body flange and the neck portion in a screw non-installed condition. The pin is axially aligned to be slidably inserted into the tapered slot whereby the pin oppositely displaces the first and second displacement portions away from each other.

According to other embodiments, a press-set threaded screw includes a screw body having: a body flange having a flange recess created in an upper flange face and at least one anti-spinout member extending axially away from a lower flange face; a neck portion integrally connected to and extending from the body flange; and a threaded member integrally connected to and extending away from the neck portion. The threaded member in a non-installed condition has first and second displacement portions separated by a tapered slot and each having a main thread portion. A pin is frictionally received in a bore created through both the body flange and the neck portion having the pin partially extending above the upper flange face in a screw non-installed condition. The pin is axially aligned for subsequent insertion into the tapered slot in a pin installed condition whereby the pin oppositely displaces the first and second displacement portions away from each other.

According to still other embodiments, a press-set threaded screw assembly includes a first connected member having an aperture. A second connected member abuts the first connected member. The second connected member has a threaded bore co-axially aligned with the aperture. A screw body includes: a body flange; a neck portion axially extending from the body flange; and a threaded member axially extending away from the neck portion. The threaded member in a non-installed condition has first and second displacement portions separated by a tapered slot each having a main thread portion. A pin is frictionally received in a bore created through both the body flange and the neck portion in a screw non-installed condition. The threaded member is inserted through the aperture of the first connected member and received in the threaded bore of the second connected member in an initial installation condition. The pin is axially aligned to be slidably inserted into the tapered slot whereby the pin oppositely displaces the first and second displacement portions away from each other to contact a plurality of female threads of the threaded bore defining an installed condition.

According to further embodiments, an insertion tool for installation of a press-set threaded screw assembly includes; a tool body; a magazine holding a plurality of press-set threaded screws for feeding in a screw feed direction; and a handle portion connected to the tool body. The tool body also includes: a frusto-conical end providing a discharge location of the press-set threaded screws; an outer pneumatic cylinder; an inner pneumatic cylinder connected to the outer pneumatic cylinder; and a screw drive member axially and slidably disposed within the tool body and extensible partially into the outer pneumatic cylinder for motion in both an installation direction and a return direction. A contact end of the screw drive member operates to push one of the press-set threaded screws outward with respect to the tool body and maintain contact with the body flange of the press-set threaded screw during an installation process.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
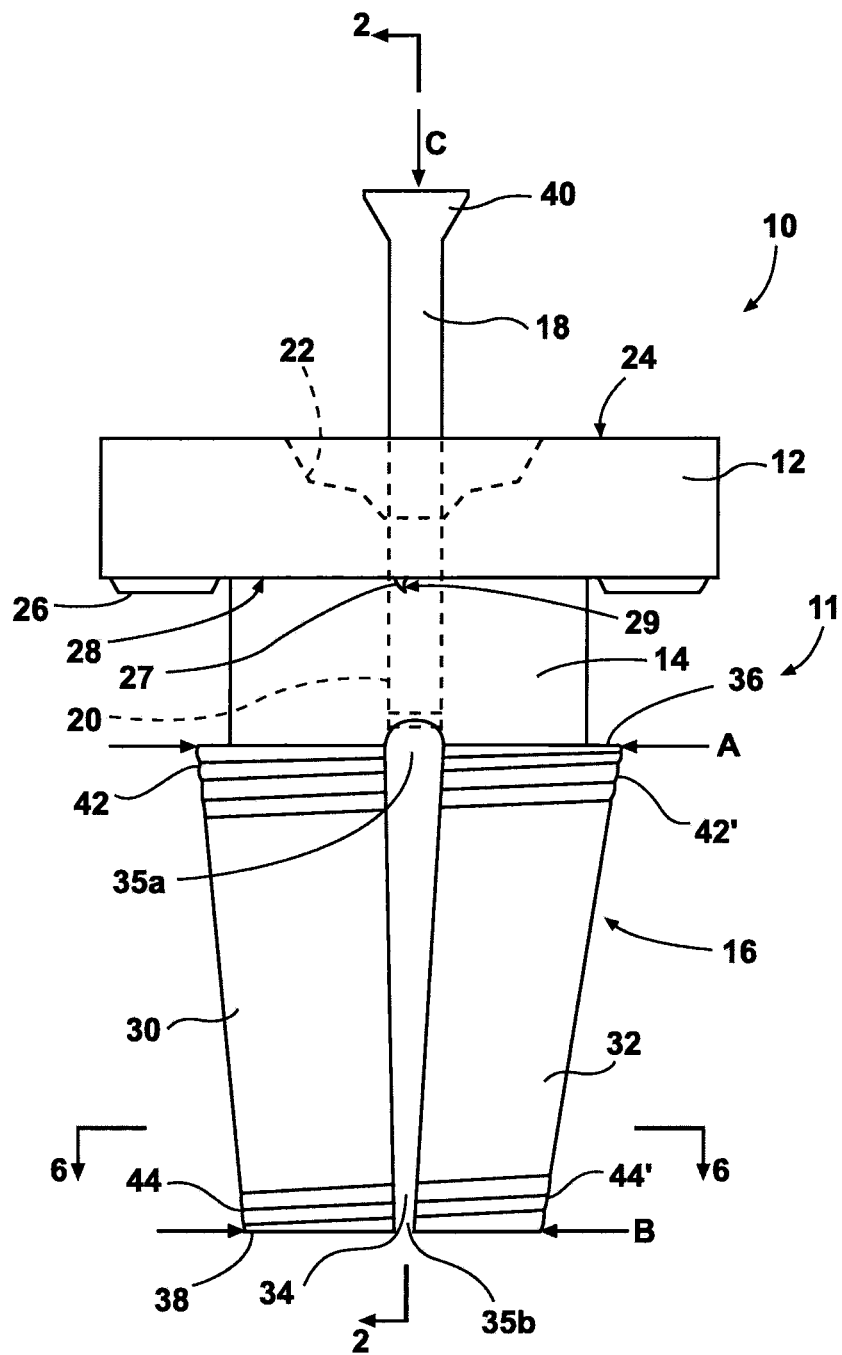
FIG. 1 is a front elevational view of a press-set threaded screw of the present disclosure.

Example embodiments will now be described more fully with reference to the accompanying drawings. Referring to FIG. 1, a screw non-installed condition is shown for a press-set threaded screw 10. Press-set threaded screw 10 includes a screw body having a body flange 12 which is integrally connected to a neck portion 14. A threaded member 16 is integrally connected to the neck portion 14 and positioned opposite about the neck portion with respect to the body flange 12. According to several embodiments, screw body can be a homogeneous manufacture such as a forging, a casting, or similar construction to integrally and non-releasably connect the body flange 12, neck portion 14 and threaded member 16. A pin 18 of a metal such as stainless steel or a polymeric material is slidably received in a bore 20 axially extending through each of the body flange 12 and neck portion 14. A diameter or width of bore 20 is selected to provide a friction fit for pin 18 such that pin 18 remains in a partially extended position shown until acted upon by an installation tool which will be discussed in greater detail in reference to FIGS. 4 and 5. A tool receiver such as a Phillips head, slotted or star-shaped head recess 22 is created in body flange 12 extending downward from an upper flange face 24. Flange recess 22 therefore extends at least partially through body flange 12 and provides for receipt of a similarly shaped tool known in the art for axially rotating screw body 11. According to several embodiments, screw body 11 is made of a steel material such as spring steel. Screw body 11 can also be made of soft steel, other metals such as aluminum or bronze, or a polymeric material.

Press-set threaded screw 10 provides features to prevent axial spinning of the screw body 11 during installation and after complete installation (by complete insertion) of pin 18. These features include at least one and according to several embodiments multiple equally spaced anti-spinout members 26. Anti-spinout members 26 can be formed having a hook or arc shape with a rounded back surface 27 to limit friction between the anti-spinout members 26 and a connected member outward facing surface 50, shown and described in reference to FIG. 2, in a direction tending to tighten or retain the tension of press-set threaded screw 10, and a sharp bite end 29 to bite into outward facing surface 50 if press-set threaded screw 10 is rotated in an opposite or thread loosening direction. Anti-spinout members 26 extend away from a lower flange face 28 of body flange 12 and face threaded member 16.

Threaded member 16 includes first and second displacement portions 30, 32 which are separated by a first tapered slot 34 which in its initial configuration defines a taper or conical shape having a slot wide end 35a proximate to neck portion 14 and an opposite slot narrow end 35b which is narrower than slot wide end 35a. Threaded member 16 further includes a threaded member first end 36 having a first diameter or width "A" which is greater than a corresponding diameter or width of the neck portion 14. First width "A" is also greater than a second diameter or width "B" of a threaded member second end 38. Threaded member second end 38 is positioned opposite to neck portion 14 and thereby defines a free end of press-set threaded screw 10.

Pin 18 includes an expanded pin contact end 40 which has a diameter or width greater than a diameter or width of the pin 18, such that pin contact end 40 cannot enter bore 20. Run-out thread portions 42, 42' of first and second displacement portions 30, 32 are created proximate to threaded member first end 36. The run-out thread portions 42, 42' are positioned proximate to the threaded member first end 36. Main thread portions 44, 44' extend from run-out thread portions 42, 42' to the free end of threaded member 16 proximate to threaded member second end 38. Run-out thread portions 42, 42', and main thread portions 44, 44' are each male threads. Main thread portions 44, 44' have a negative pitch and can have approximately a 58 degree angled thread to act together with the anti-spinout members 26 to resist back-out of the press-set threaded screw 10 after installation.

Referring to FIG. 2 and again to FIG. 1, press-set threaded screw 10 is used for joining at least first and second connected members, such as panels, plates, bars, or the like. Press-set threaded screw 10 is oriented to initially position threaded member 16 for insertion in an installation direction "C" entirely through an aperture 46 created in a first connected member 48 such that first and second displacement portions 30, 32 of threaded member 16 are received in a second connected member 49 when the plurality of anti-spinout members 26 contact a member outward facing surface 50 of first connected member 48. The frictional engagement between anti-spinout members 26 and member outward facing surface 50 thereafter precludes axial spinning of screw body 11 for the remainder of the installation process. With continuing reference to both FIGS. 1 and 2, aperture 46 has a diameter "$D_1$" which is greater than the first width "A" and therefore greater than the second width "B" of threaded member 16. This diameter difference ($D_1$-A) permits the threaded member 16 to freely slide through aperture 46 to be received in a threaded bore 52 created in second connected member 49. Neck portion 14 has a diameter "$D_2$" which is less than both diameter "$D_1$" and first width "A". Threaded bore 52 includes a plurality of female threads 54 having a pitch initially engaging the run-out thread portions 42, 42' of threaded member 16.

First connected member 48 has a first connected member thickness "G" which is equal to or less than a neck extending length "H" of neck portion 14. This ensures that the run-out thread portions 42, 42' of first and second displacement portions 30, 32 are received in threaded bore 52 which is co-axially aligned with aperture 46. A second connected member thickness "J" of second connected member 49 is equal to or greater than a threaded member length "K" of threaded member 16 such that all of the threads (42, 42', 44, 44') of threaded member 16 can engage with the female threads 54 of threaded bore 52.

Figure 2:
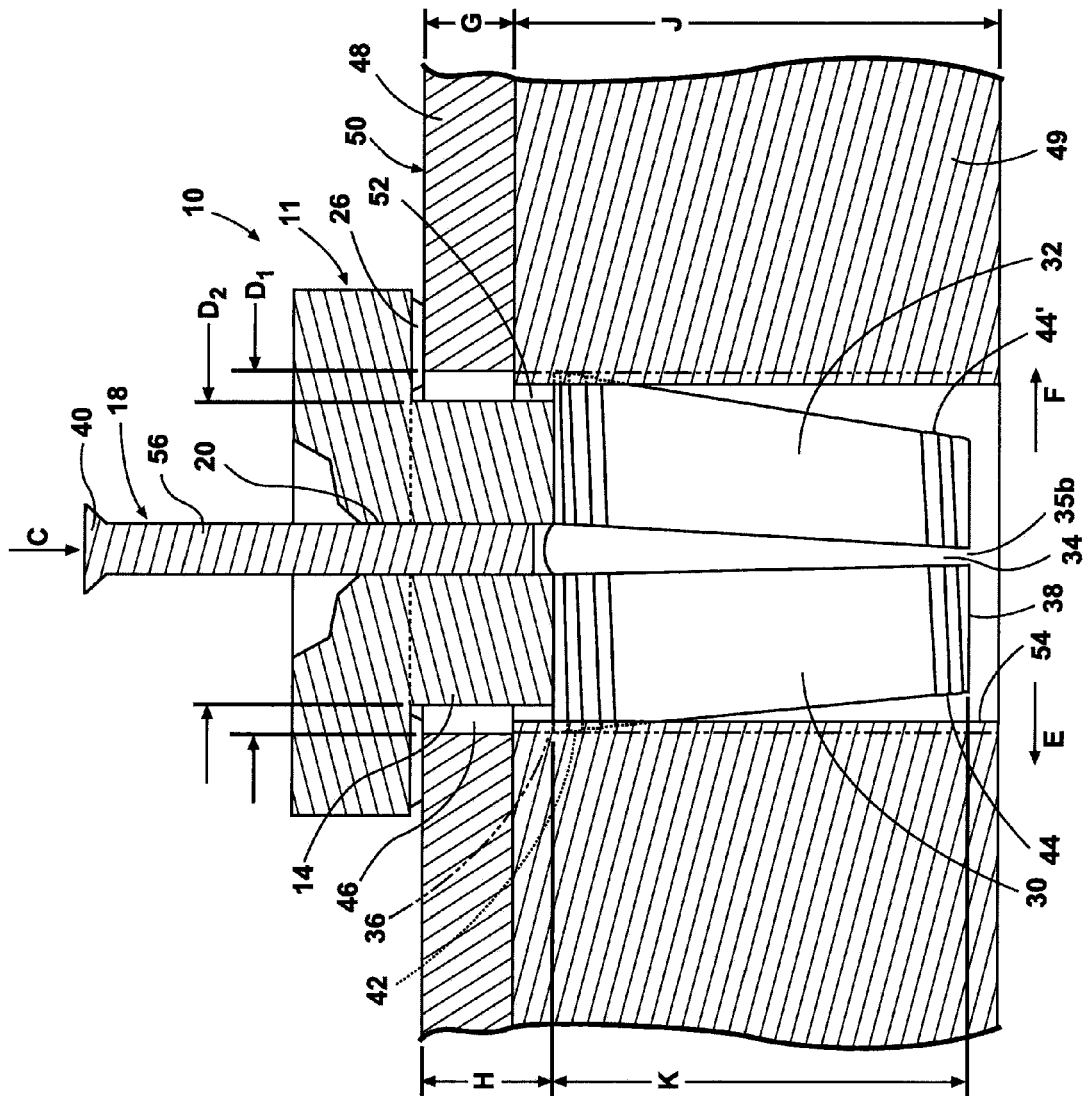
FIG. 2 is a partial cross sectional side elevational view taken at section 2 of FIG. 1 further showing the press-set threaded screw in an initial installation position.
Figure 3:
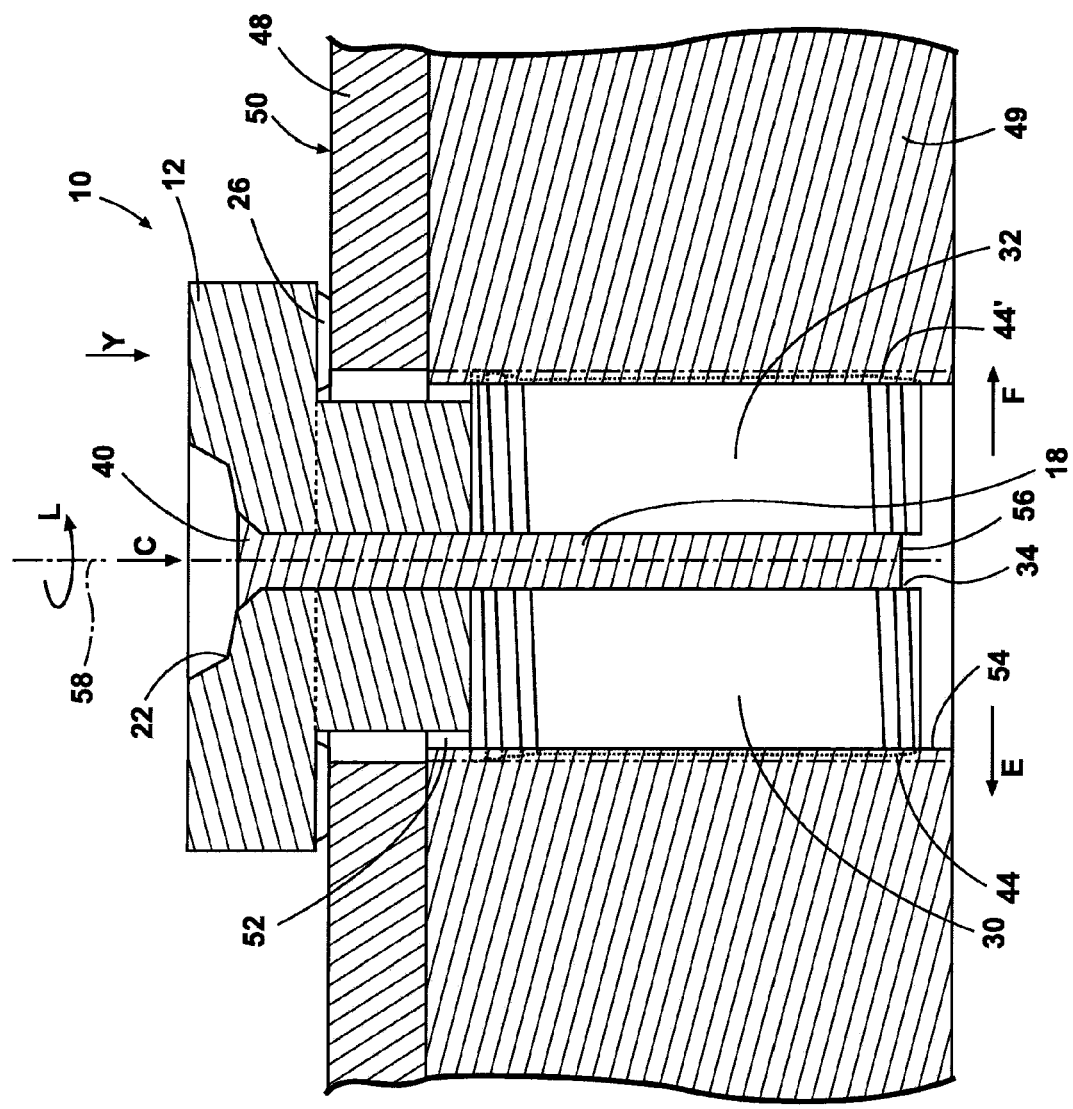
FIG. 3 is a partial cross sectional side elevational view similar to FIG. 2 further showing the press-set threaded screw in a completed installation position.

With press-set threaded screw 10 positioned in an initial installation condition shown in FIG. 2, the threaded member second end 38 has its second thread portion 44, 44' of first and second displacement portions 30, 32 spaced freely away from contact with the female threads 54. From the initial installation position, a pin shaft 56 of pin 18 is subsequently driven downward in the installation direction "C". The width of pin shaft 56, which is greater than a spacing between first and second displacement portions 30, 32 at the slot narrow end 35b of slot 34, displaces the first and second displacement portions 30, 32 at threaded member second end 38 outwardly in each of a first expansion direction "E" and an opposite second expansion direction "F" such that second thread portions 44, 44' engage with the female threads 54 of threaded bore 52 as will be shown and described in greater detail in reference to FIG. 3. The initial installation position of press-set threaded screw 10 can also be returned to permitting removal of a previously installed press-set threaded screw 10 from both threaded bore 52 and aperture 46.

Referring to FIG. 3 and again to FIGS. 1 and 2, to engage press-set threaded screw 10 in a fully installed condition which will couple first connected member 48 to second connected member 49, a force "Y" is applied in the installation direction "C" to the pin contact end 40 which slides the pin shaft 56 substantially through slot 34 until pin contact end 40 reaches a bottom of flange recess 22 and is stopped from further motion in the installation direction "C" by contact between pin contact end 40 and body flange 12. In the inserted position of pin shaft 56, first displacement portion 30 is displaced in the first expansion direction "E" and second displacement portion 32 is oppositely displaced in the second expansion direction "F" with respect to a screw longitudinal axis 58 until the main thread portions 44, 44' of threaded member 16 are fully engaged with the female threads 54 of threaded bore 52. During installation, the negative pitch and approximately 58 degree angled thread of main thread portions 44, 44' engage female threads 54 of threaded bore 52 and pull the threaded member 16 further into the threaded bore 52 to increase a setting force of press-set threaded screw 10.

The complete engagement of threaded member 16 within threaded bore 52 completes the installation of press-set threaded screw 10 while the anti-spinout members 26 resist axial rotation about screw longitudinal axis 58 with respect to a removal axial rotation "L". Press-set threaded screw 10 is thereafter retained in this completed or fully installed condition until a tool (not shown) is engaged in flange recess 22 to rotate press-set threaded screw 10 in removal axial rotation "L". Removal axial rotation "L" is counterclockwise if runout and main thread portions 42, 42', 44, 44' are right-hand threads, and vice-versa.

Figure 4:
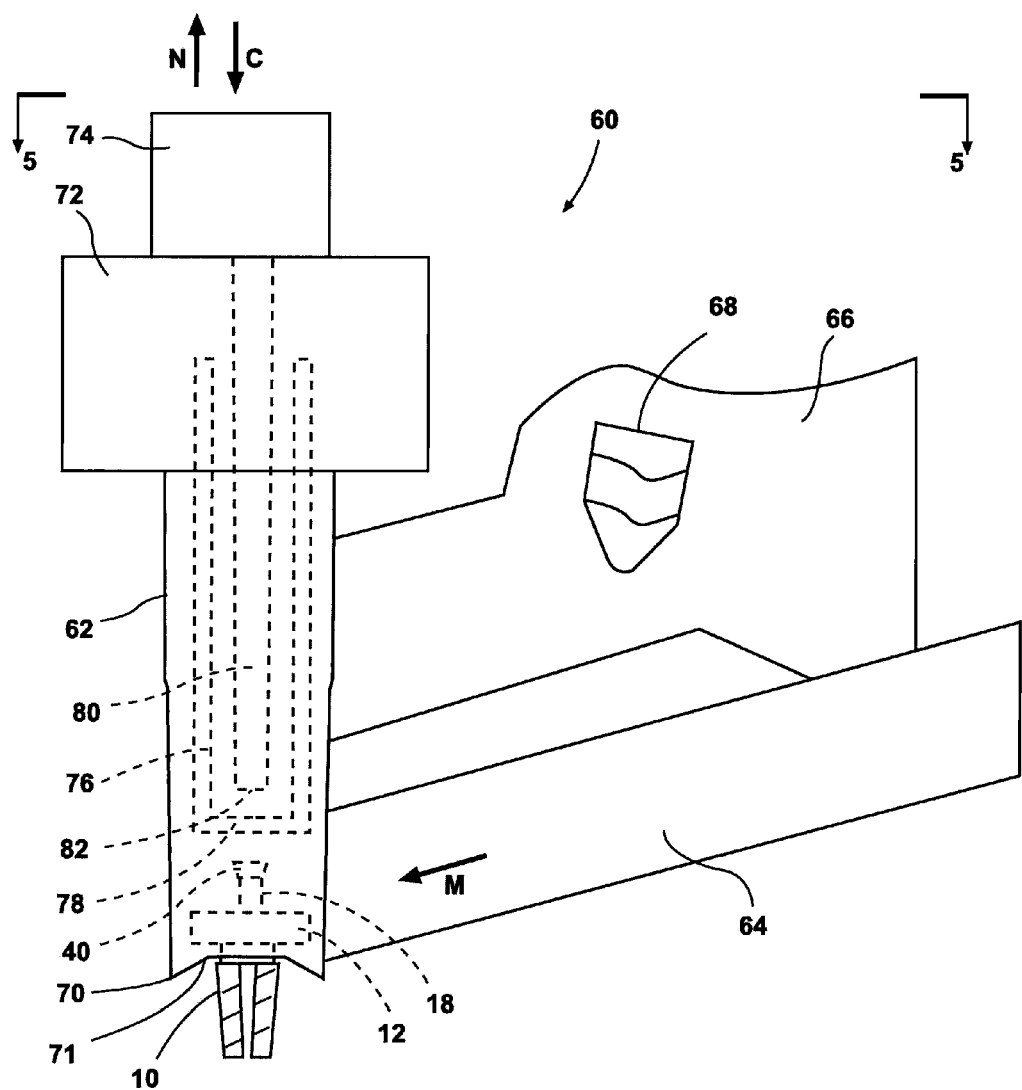
FIG. 4 is a front elevational view of an installation tool for installation of press-set threaded screws of the present disclosure.

Referring to FIG. 4, an installation tool 60 can be used for installation of press-set threaded screws 10. Installation tool 60 includes a tool body 62 to which is connected a magazine or feed portion 64 holding a plurality of press-set threaded screws 10 for feeding in a screw feed direction "M", and a handle portion 66 which can be connected to both tool body 62 and feed portion 64. A two-stage trigger 68 is provided with handle portion 66 whose operation will be described in better detail in reference to FIG. 5.

Tool body 62 includes a frusto-conical end 70, located at a discharge location 71 of press-set threaded screws 10, and an outer pneumatic cylinder 72. An inner pneumatic cylinder 74 is connected to outer pneumatic cylinder 72. A screw drive member 76 is axially, slidably disposed within tool body 62 and can extend partially into outer pneumatic cylinder 72 for motion in both the installation direction "C" and a return direction "N". A contact end 78 of screw drive member 76 is provided to push press-set threaded screw 10 outward with respect to tool body 62 and maintain contact with the body flange 12 of press-set threaded screw 10 during the installation process. A pin drive member 80 is axially, slidably disposed within screw drive member 76 within tool body 62 and can extend partially into outer pneumatic cylinder 72. Similar to screw drive member 76, pin drive member 80 is independently displaceable in each of the installation direction "C" and the return direction "N". A pin drive end 82 is provided with pin drive member 80, which contacts the pin contact end 40 of pin 18 to slidably displace pin 18 as shown and described with reference to FIG. 3. Two-stage trigger 68 provides for independent operation of each of the screw drive member 76 and the pin drive member 80 with respect to each other.

Figure 5:
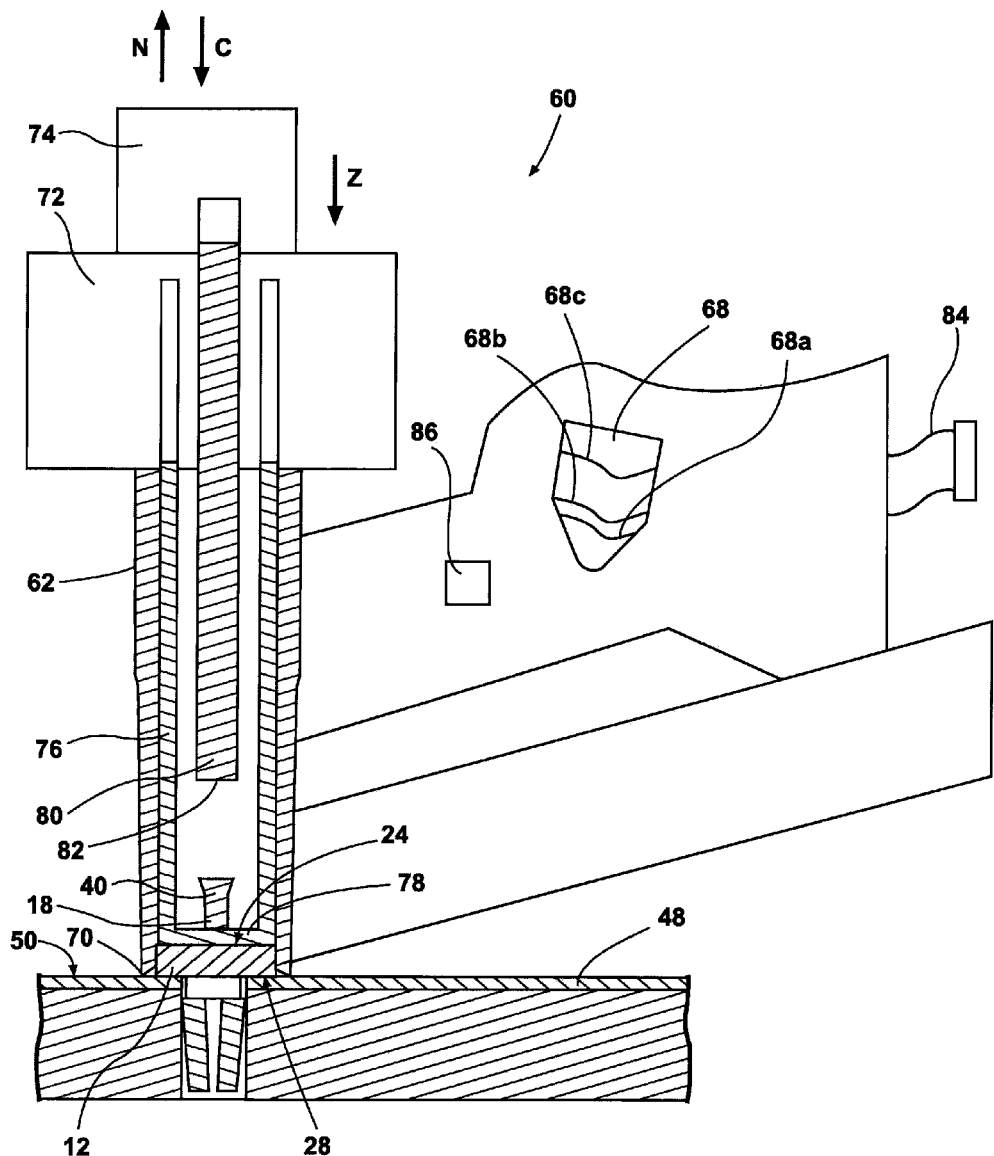
FIG. 5 is a partial cross sectional front elevational view taken at section 5 of FIG. 4.

Referring to FIG. 5, installation tool 60 is operated by initially positioning the frusto-conical end 70 of tool body 62 in firm contact with the member outward facing surface 50 of first connected member 48. This is done for example by applying manual pressure to the external surface of outer pneumatic cylinder 72 by the operator of installation tool 60 in the installation direction "C". The two-stage trigger 68 which is initially biased to an off position 68a is first displaced to a first displacement position 68b which delivers pneumatic pressure through a pneumatic system connector 84 through handle 66 to outer pneumatic cylinder 72 to slide screw drive member 76 in the installation direction "C" until contact end 78 contacts the upper flange face 24 of body flange 12. This contact is maintained to press and hold body flange 12 in contact with member outward facing surface 50 of first connected member 48.

After screw drive member 76 reaches its fully extended position shown, a safety device 86 permits two-stage trigger 68 to be moved to a second displacement position 68c which actuates internal flow paths (not shown) within outer pneumatic cylinder 72 to deliver pneumatic pressure to displace pin drive member 80 in the installation direction "C". Pin drive end 82 contacts pin contact end 40 and pushes pin 18 in the installation direction "C" until pin 18 reaches the position shown and described in reference to FIG. 3. By thereafter releasing the two-stage trigger 68 which returns to the off position 68a, both the pin drive member 80 and screw drive member 76 are retracted in the return direction "N" which allows delivery of a new press-set threaded screw 10 for installation at a different location.

For optimum operation of installation tool 60, a force "Z", acting parallel to the installation direction "C" is provided by the operator of installation tool 60 by contact with either or both outer pneumatic cylinder 72 and inner pneumatic cylinder 74. Force "Z" is can equal or exceed a force generated by the pneumatic pressure acting to displace screw drive member 76 and/or pin drive member 80 in the installation direction "C" such that force "Z" is sufficient to hold frusto-conical end 70 in contact with member outward facing surface 50 during the entire installation process of a press-set threaded screw 10. The pressure of the pneumatic fluid used during operation of installation tool 60 can be predetermined and/or relieved to prevent installation tool 60 from itself moving in the return direction "N" during the installation process.

Figure 6:
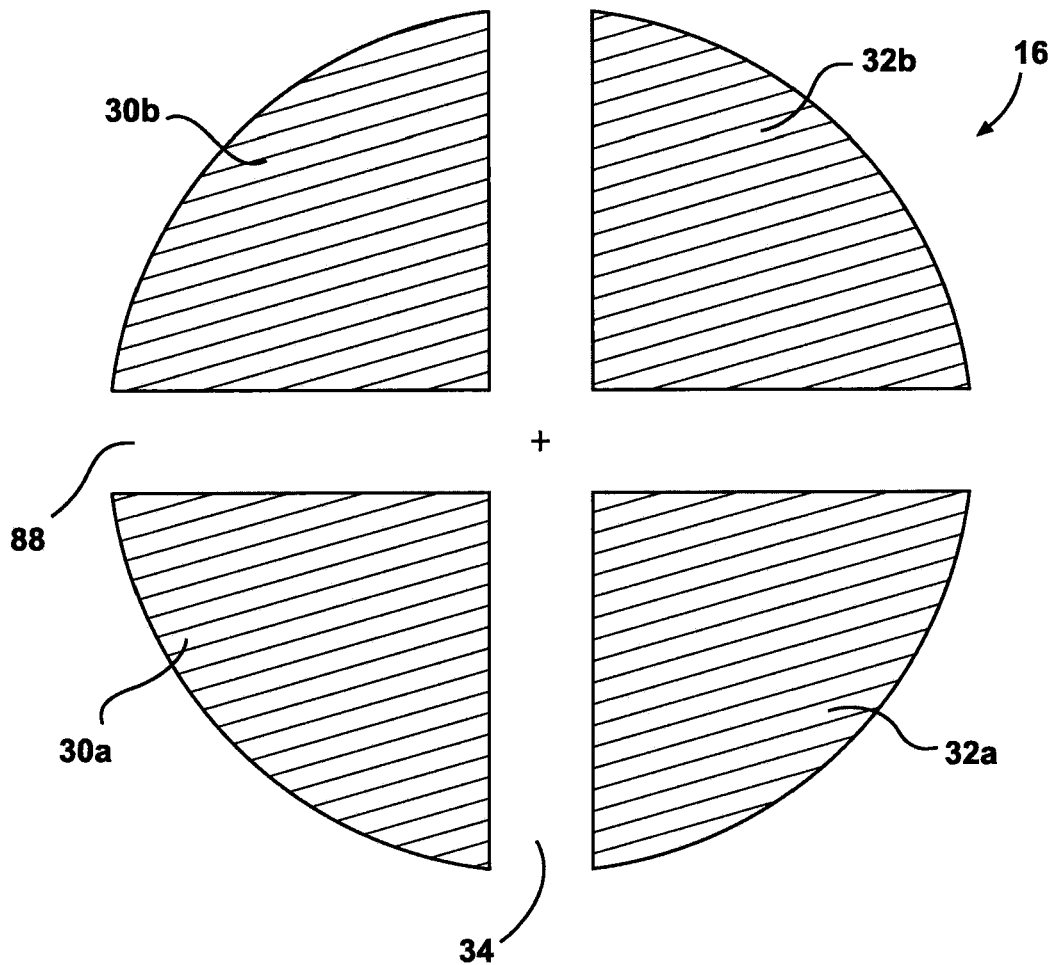
FIG. 6 is a cross sectional top plan view taken at section 6 of FIG. 1.

Referring to FIG. 6 and again to FIG. 1, threaded member 16 can be further divisible by the addition of a second slot 88 which is oriented substantially perpendicular to first slot 34. Second slot 88, together with first slot 34 divide first displacement portion 30 into first and second displacement sub-portions 30a, 30b, and divide second displacement portion into third and fourth displacement sub-portions 32a, 32b. The use of both first slot 34 and second slot 88 permit the first, second, third and fourth displacement sub-portions 30a, 30b, 32a, 32b to continuously taper from the threaded member first end 36 to the threaded member second end 38, allowing threaded member 16 to be formed in a frusto-conical shape between threaded member first and second ends 36, 38.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A press-set threaded screw, comprising:
    a screw body, having:
        a body flange;
        at least one anti-spinout member extending from the body flange;
        a neck portion axially extending from the body flange; and
        a threaded member axially extending away from the neck portion, the threaded member in a non-installed condition having first and second displacement portions each having a main thread portion, the first and second displacement portions separated by a first slot, the first displacement portion further divided into first and second sub-portions and the second displacement portion further divided into third and fourth sub-portions by a second slot which is oriented substantially perpendicular to the first slot, the perpendicular orientation of the first and second slots permitting the first, second, third and fourth sub-portions to continuously taper from a threaded member first end to a threaded member second end, such that the threaded member is formed in a frusto-conical shape between the threaded member first and second ends; and
    a pin frictionally received in a bore created through both the body flange and the neck portion in a screw non-installed condition, the pin axially aligned to be slidably inserted into the first slot whereby the pin oppositely displaces the first and second displacement portions away from each other.

2. The press-set threaded screw of claim 1, wherein the first and second displacement portions of the threaded member each include a run-out thread portion located proximate to a threaded member first end positioned proximate to the neck portion.

3. The press-set threaded screw of claim 2, wherein the main thread portion of each of the first and second displacement portions extends from the run-out thread portion to a threaded member second end.

4. The press-set threaded screw of claim 1, wherein the at least one anti-spinout member is integrally connected to and extending away from the body flange and is facing the threaded member.

5. The press-set threaded screw of claim 4, wherein the at least one anti-spinout member includes four anti-spinout members equally spaced about a lower flange face of the body flange, each of the anti-spinout members having an arc shape.

6. A press-set threaded screw, comprising:
    a screw body, having:
        a body flange having a flange recess created in an upper flange face and at least one anti-spinout member extending axially away from a lower flange face;
        a neck portion integrally connected to and extending from the body flange; and
        a threaded member integrally connected to and extending away from the neck portion, the threaded member in a non-installed condition having first and second displacement portions separated by a first tapered slot and each having a main thread portion, the first tapered slot creating a frusto-conical shape of the first and second displacement portions between a threaded member first end proximate the neck portion and a threaded member second end; and
    a pin frictionally received in a bore created through both the body flange and the neck portion having the pin partially extending above the upper flange face in a screw non-installed condition, the pin axially aligned for subsequent insertion into the first slot in a pin installed condition whereby the pin oppositely displaces the first and second displacement portions away from each other.

7. The press-set threaded screw of claim 6, wherein the first tapered slot includes a slot wide end positioned proximate to the threaded member first end having a first width, and a slot narrow end positioned proximate to the threaded member second end having a second width smaller than the first width.

8. The press-set threaded screw of claim 7, wherein the slot wide end is positioned proximate the neck portion and the slot narrow end is positioned proximate a free end of the threaded member.

9. The press-set threaded screw of claim 7, wherein the slot wide end is substantially equal to a width of the pin.

10. The press-set threaded screw of claim 6, further including a second tapered slot oriented substantially perpendicular to the first tapered slot, wherein the first and second tapered slots divide the first displacement portion into first and second sub-portions and divide the second displacement portion into third and fourth sub-portions.

11. A press-set threaded screw assembly, comprising:
a first connected member having an aperture with a first diameter;
a second connected member abutting the first connected member, the second connected member having a threaded bore co-axially aligned with the aperture, the threaded bore having a second diameter smaller than the first diameter; and
a screw body, having:
a body flange;
at least one anti-spinout member extending from the body flange;
a neck portion axially extending from the body flange; and
a threaded member axially extending away from the neck portion, the threaded member in a non-installed condition having first and second displacement portions separated by a tapered slot each having a main thread portion, the threaded member having a first width at a first end and a second width smaller than the first width at a second end, the first width being smaller than the first diameter and greater than the second diameter allowing the threaded member to pass through the aperture of the first connected member to engage with the threaded bore of the second connected member; and
a pin frictionally received in a bore created through both the body flange and the neck portion in a screw non-installed condition, the threaded member inserted through the aperture of the first connected member and received in the threaded bore of the second connected member in an initial installation condition, the pin axially aligned to be slidably inserted into the tapered slot whereby the pin oppositely displaces the first and second displacement portions away from each other to contact a plurality of female threads of the threaded bore defining an installed condition.

12. The press-set threaded screw assembly of claim 11, wherein the body flange includes a flange recess created in an upper flange face, and a plurality of anti-spinout members extending axially away from a lower flange face.

13. The press-set threaded screw assembly of claim 12, wherein the initial installation condition is reached when the plurality of anti-spinout members contact a member outward facing surface of the first connected member.

14. The press-set threaded screw assembly of claim 12, wherein a force applied in an installation direction to a pin contact end slides the pin substantially through the tapered slot until the pin contact end reaches a bottom of the flange recess and is stopped from further motion in the installation direction by contact between the pin contact end and the body flange.

15. The press-set threaded screw of claim 11, wherein threads of the main thread portions have a negative pitch and approximately a 58 degree angled thread to resist back-out of the threaded member of the press-set thread screw from the threaded bore in the installed condition.

* * * * *